(12) United States Patent
Rao et al.

(10) Patent No.: US 10,560,621 B2
(45) Date of Patent: Feb. 11, 2020

(54) METHODS AND APPARATUS FOR CONTROLLING A NETWORKED CAMERA

(75) Inventors: Mahesh Vittal Rao, Karnataka (IN); Sateesh Veerabhadrappa Angadi, Karnataka (IN); Saravana Babu, Bangalore (IN); Ajith Kumar, Tamil Nadu (IN); Vikram B. Mangeshwar, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 635 days.

(21) Appl. No.: 12/949,941

(22) Filed: Nov. 19, 2010

(65) Prior Publication Data

US 2012/0127319 A1 May 24, 2012

(51) Int. Cl.
*H04N 5/225* (2006.01)
*H04N 5/232* (2006.01)

(52) U.S. Cl.
CPC ..... *H04N 5/23206* (2013.01); *H04N 5/23222* (2013.01); *H04N 2201/0015* (2013.01); *H04N 2201/3253* (2013.01)

(58) Field of Classification Search
CPC ..... H04N 2201/0094; H04N 21/64322; H04N 21/233; H04N 21/2347; H04N 1/00204; H04N 1/00244; H04N 1/00408; H04N 1/32122; H04W 12/06; H04W 4/023; H04W 4/22; H04W 88/06; H04W 64/00; H04W 88/02; H04W 4/025; H04W 84/06; H04W 4/02; H04W 4/008; G06F 3/044; G06F 3/0416; G06F 3/0482; G06F 3/0412; G06F 3/0418; G06F 2203/04101; G06F 3/017; G06F 3/0414; G06F 3/04883; G06F 17/30011; G06F 17/30253; G06F 17/30401; G06F 17/30477; G06F 17/30165; G06F 3/005; G06F 3/0485; G06F 2203/04806; G06F 3/0346; G06F 3/04815; G06F 3/04845; G06F 19/00; G06F 1/1626; G06F 3/014; G06F 3/015; G08C 2201/32; G08C 2201/12; G08C 2201/33; G08C 2201/34; G08C 2201/42; G08C 2201/60; G08C 2201/61; G08C 2201/70; G08C 2201/92

See application file for complete search history.

(56) References Cited

U.S. PATENT DOCUMENTS 5,926,209 A * 7/1999 Glatt ............................ 348/143
5,929,904 A * 7/1999 Uchida ...................... 348/211.7

(Continued)

FOREIGN PATENT DOCUMENTS

JP 2007053643 A * 3/2007

*Primary Examiner* — Dave Czekaj
*Assistant Examiner* — Kehinde Abimbola

(57) ABSTRACT

An apparatus for controlling a remote camera is described. The apparatus includes a housing and a processor positioned within the housing. A transceiver coupled to the processor communicates with a remote server. The remote server is coupled to the remote camera. A motion tracking component is mechanically coupled to the housing and electrically coupled to the processor. The motion tracking component generates a motion signal. The remote server controls a parameter of the remote camera in response to the motion signal. A display is coupled to the processor for displaying the output signal from the remote camera. The output signal is associated with the parameter of the remote camera.

20 Claims, 6 Drawing Sheets

(56) References Cited

U.S. PATENT DOCUMENTS

| | | | |
|---|---|---|---|
| 6,313,875 B1* | 11/2001 | Suga et al. | 348/211.99 |
| 6,356,303 B1* | 3/2002 | Shibata et al. | 348/211.1 |
| 6,380,972 B1* | 4/2002 | Suga et al. | 348/211.99 |
| 6,400,401 B1* | 6/2002 | Morino et al. | 348/211.1 |
| 6,421,452 B1* | 7/2002 | Matsuura et al. | 382/107 |
| 6,529,234 B2* | 3/2003 | Urisaka et al. | 348/211.99 |
| 6,891,566 B2* | 5/2005 | Marchese | 348/211.3 |
| 6,909,458 B1* | 6/2005 | Suzuki et al. | 348/211.8 |
| 6,930,703 B1* | 8/2005 | Hubel et al. | 348/37 |
| 6,954,859 B1* | 10/2005 | Simerly et al. | 726/3 |
| 7,023,913 B1* | 4/2006 | Monroe | 375/240.01 |
| 7,106,361 B2* | 9/2006 | Kanade et al. | 348/159 |
| 7,199,817 B2 | 4/2007 | Mottur et al. | |
| 7,415,385 B2* | 8/2008 | Azarbayejani et al. | 702/182 |
| 7,502,498 B2* | 3/2009 | Wen et al. | 382/128 |
| 7,733,371 B1* | 6/2010 | Monroe | 348/153 |
| 7,782,363 B2* | 8/2010 | Ortiz | 348/211.8 |
| 7,907,750 B2* | 3/2011 | Ariyur et al. | 382/103 |
| 7,952,561 B2* | 5/2011 | Liu | G06F 1/1616 345/158 |
| 7,956,891 B2* | 6/2011 | Uchihara | 348/143 |
| 8,031,231 B2* | 10/2011 | Suga et al. | 348/211.99 |
| 8,142,288 B2* | 3/2012 | Zalewski | 463/39 |
| 8,170,277 B2* | 5/2012 | Michimoto et al. | 382/103 |
| 8,312,133 B2* | 11/2012 | Kurosawa | 709/224 |
| 8,351,910 B2* | 1/2013 | Horodezky | G06F 3/017 455/414.2 |
| 2002/0003575 A1* | 1/2002 | Marchese | 348/231 |
| 2002/0145660 A1* | 10/2002 | Kanade et al. | 348/36 |
| 2003/0174242 A1* | 9/2003 | Carmi | H04N 1/00127 348/376 |
| 2003/0212758 A1* | 11/2003 | Anderson | H04N 1/00204 709/217 |
| 2005/0036036 A1* | 2/2005 | Stevenson et al. | 348/211.99 |
| 2005/0169367 A1* | 8/2005 | Venetianer et al. | 375/240.01 |
| 2006/0075448 A1 | 4/2006 | McAlpine et al. | |
| 2006/0282682 A1* | 12/2006 | Masaki et al. | 713/186 |
| 2007/0052801 A1* | 3/2007 | Shimamura | 348/140 |
| 2007/0286456 A1* | 12/2007 | Ariyur et al. | 382/103 |
| 2008/0117168 A1* | 5/2008 | Liu | G06F 1/1616 345/158 |
| 2008/0211929 A1* | 9/2008 | Uchihara | 348/231.99 |
| 2009/0201313 A1* | 8/2009 | Thorn | G06K 9/00228 345/620 |
| 2010/0026809 A1* | 2/2010 | Curry | 348/157 |
| 2010/0138797 A1* | 6/2010 | Thorn | G06F 3/017 715/863 |
| 2011/0054833 A1* | 3/2011 | Mucignat | G06F 3/017 702/150 |
| 2011/0285854 A1* | 11/2011 | LaDuke et al. | 348/169 |
| 2011/0298829 A1* | 12/2011 | Stafford | G06K 9/3208 345/659 |
| 2012/0054689 A1* | 3/2012 | Friedman | G06F 3/04845 715/849 |
| 2012/0120261 A1* | 5/2012 | Mehra | H04N 1/00291 348/207.11 |
| 2012/0127319 A1* | 5/2012 | Rao et al. | 348/169 |
| 2012/0206606 A1* | 8/2012 | Marchese | 348/159 |
| 2012/0218416 A1* | 8/2012 | Leny et al. | 348/159 |

* cited by examiner

METHODS AND APPARATUS FOR CONTROLLING A NETWORKED CAMERA

TECHNICAL FIELD

This invention relates generally to panning, tilting, zooming and focusing in remote cameras, and more particularly, to the mechanical panning, tilting, zooming and focusing of a networked webcam controlled by a mobile device such as a cellular telephone.

BACKGROUND

Today, more people communicate over wireless networks than ever before. The use of video conferencing has also increased. The wide availability of networked webcams has made video conferencing even more popular. So-called smart cellular telephones can connect to the internet and display video signals, but generally have no control over the source of the video signal.

SUMMARY

In one aspect, the invention is embodied in an apparatus for controlling a remote camera. The apparatus includes a housing containing a processor. A transceiver is coupled to the processor for communicating with a remote server. The remote server is coupled to the remote camera. A motion tracking component is mechanically coupled to the housing and electrically coupled to the processor. The motion tracking component generates a motion signal. The remote server controls a parameter of the remote camera in response to the motion signal. A display is coupled to the processor for displaying an output signal from the remote camera. The output signal is associated with the parameter of the remote camera.

In some embodiments, the parameter includes a pan, a tilt, a zoom, and/or a focus. The remote camera can be a webcam. In one embodiment, the output signal is a video signal. The transceiver can be a cellular radio. The display can be touch screen display. In one embodiment, a face detection module is coupled to the processor. The face detection module can control a parameter of the remote camera in response to a detection of a face. In some embodiments, the motion tracking component includes at least one of an accelerometer, a gyroscope, a global positioning system (GPS) module, a magnetometer, and a digital compass.

In another aspect, the invention is embodied in a system for controlling parameters of a camera. The system includes a mobile device having an accelerometer for generating a motion signal based on a motion of the mobile device. A remote server communicates with the mobile device. The remote server receives the motion signal. A remote camera communicates with the remote server. The remote server controls a parameter of the remote camera in response to the motion signal.

The mobile device can also include a transceiver for communicating with the remote server. The transceiver can be a cellular radio. In one embodiment, the remote server and the remote camera are integrated into a single remote unit. In one embodiment, the mobile device further includes a display for displaying an output signal from the remote camera. The output signal is associated with the parameter of the remote camera.

In one embodiment, the output signal includes a video signal. The parameter can include a pan, a tilt, a zoom, and/or a focus. The remote camera can be a webcam. In one embodiment, the mobile device also includes a face detection module. The face detection module controls a parameter of the remote camera in response to a detection of a face.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

Figure 1:
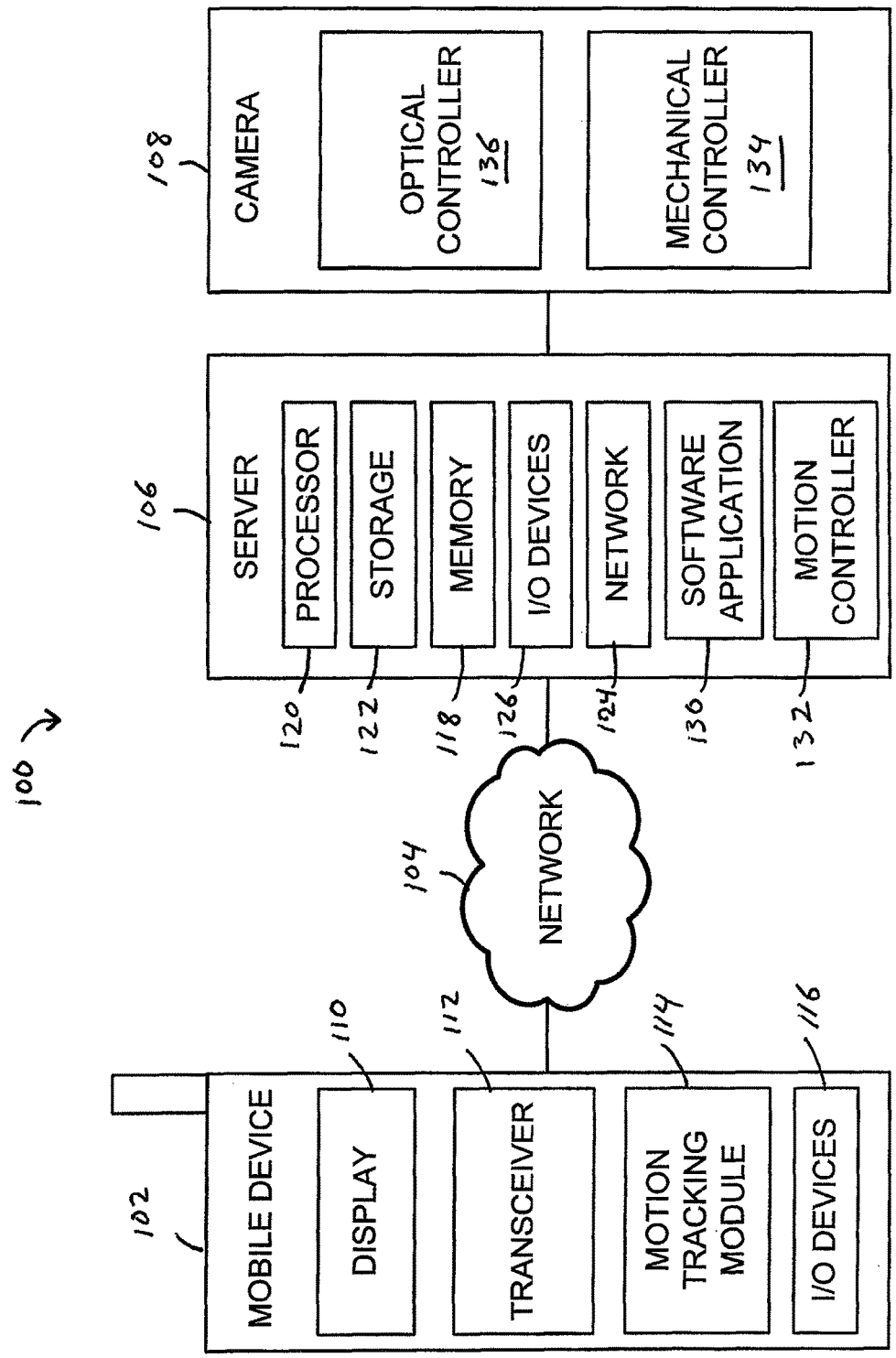
FIG. 1 illustrates a block diagram of one embodiment of a system according to the invention.

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional image-based capture, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to portable devices for controlling certain parameters of webcams. In an exemplary embodiment, a remote webcam is coupled through a network to a mobile device having a motion tracking module, such as a cellular telephone. The mobile device is capable of controlling pan, tilt, zoom and focus of the webcam, for example.

For purposes of description herein, camera control can be referred to as zoom, focus, pan and tilt, where pan is understood to be left-right camera motion, while tilt is understood to be camera up-down motion. With regard to the image within the Cartesian coordinate system, horizontal motion of the mobile device can be referred to herein as motion in the "x" direction, while vertical (tilt) movement can be referred to herein as motion in the "y" direction. Zoom motion can be referred to herein as motion in the "z" direction. Accordingly, for the mobile device moving solely in the x direction, this translates to panning the camera in the x direction. Similarly, for the mobile device moving solely in the y direction, this translates to tilting the camera in the y direction. Furthermore, moving the mobile device in both the x and y directions translates to camera control in both the pan and tilt directions.

FIG. 1 illustrates a block diagram of one embodiment of a system 100 according to the invention. The system 100 includes a mobile device 102, a network 104, a server 106, and a webcam 108. A user of the mobile device 102 can control certain parameters of the webcam 108 by moving the mobile device 102. In one embodiment, a device, such as a cellular telephone having an integrated camera can be substituted for the webcam 108. The device can also function as the sever 106.

The mobile device 102 includes a display 110 for displaying images from the webcam 108 as well as data relating to the mobile device 102. A transceiver 112 connects the mobile device 102 to the network 104 by providing communication functionality for the mobile device 102. The mobile device 102 can also include a motion tracking module 114 that can track the motion of the mobile device 102. The motion tracking module 114 can include an accelerometer, for example. The mobile device 102 also includes one or more input/output (I/O) devices 116 such as a keyboard with alpha-numeric keys and the integrated display 110 (e.g., LED, OELD) that displays information such as video signals from the webcam. Other I/O elements can include soft and/or hard keys, a touch screen, a joystick, a trackball, a thumbwheel, an optical mouse, a touch pad, a jog wheel, an optical control, and/or a pointing device, a microphone, and a speaker, for example. In some embodiments, the device 102 includes more or less than all of the aforementioned I/O elements. Components of the mobile device 102 will be discussed in more detail herein with reference to FIG. 2.

The server 106 can be a stand-alone computer coupled to the network 104 and the webcam 108. Alternatively, the server 106 can be integrated with the webcam 108. For example, the server 106 can embody a mobile device having an integrated camera. The server 106 can be a personal computer (desktop or laptop), a handheld computer, a Personal Digital Assistant (PDA), or a cellular phone, for example. The server 106 can include a memory 118, a processor 120, a storage device 122, a network connection module 124, and input/output devices 126 such as a display, a mouse, a printer, and/or a keyboard.

The server 106 also includes a software application 130 that receives control signals from the mobile device 102. The control signals are generated from the motion of the mobile device 102 by the motion tracking module 114. The software application 130 transmits instructions to a motion controller 132. The motion controller 132 controls the parameters of the webcam 108, such as pan, tilt, zoom and focus. Various techniques for controlling mechanical motion can be used without departing from the invention.

The network connection module 124 can include hardware and software required to connect the server 106 to the network 104. The network 104 can be any network, such as a Wide Area Network (WAN) or a Local Area Network (LAN), or any other network including a cellular network. The WAN may include the Internet, for example. A LAN may include an Intranet, for example.

The webcam 108 can be any type of camera that is located remotely from the mobile device 102. The webcam 108 can be coupled to the server 106 using conventional techniques such as through a serial or parallel port. Alternatively, the webcam 108 can be coupled to the server 106 through a network connection, such as a LAN, wireless LAN, Bluetooth or Zigbee network connection. The webcam 108 can include mechanical 134 and optical controllers 136 for controlling the pan, tilt, zoom and focus of the webcam 108. Alternatively, the webcam 108 can be coupled to an optical stage (not shown) that is capable of controlling the motion of the webcam 108.

In one embodiment, the optical controller 136 includes a focusing lens, a focusing sensor, and firmware for focusing the lens and processing video signals. In one embodiment, the focusing sensor can automatically adjust the focus of the lens. Alternatively, the lens can be manually focused using the mobile device 102 as described herein. The mechanical controller 134 includes the drivers and mechanics for focusing the lens, controlling a zoom lens, and controlling the pan and tilt movements of the webcam 108.

In one embodiment, actuators are used for moving the lens. For example, the actuators cause the lens to be displaced through a gearbox that translates the actuator revolutions into linear motion. In one embodiment, multiple actuators and multiple gearboxes are used, and each actuator controls one gearbox. For example, the webcam firmware receives control signals from the server 106 to focus the lens or control the zoom. The firmware sends signals to the actuators which in turn move the gearboxes, which in turn focuses the webcam and/or zooms the lens in or out.

Mechanics, such as actuators can also be used to move the webcam 108 for panning left/right and tilting up/tilt down. Other movements can also be achieved, such as lateral translation. In one embodiment, multiple actuators and multiple gearboxes are used, and each actuator controls one gearbox. For example, the webcam firmware receives control signals from the server 106 to pan the webcam left or right or to tilt the webcam up or down. The firmware sends signals to the actuators which in turn move the gearboxes, thereby moving the webcam. The actuators could be solenoids, servos, or stepper motors, for example. Other mechanical techniques can also be used.

As previously described, the mobile device 102 can be a mobile computer, a personal digital assistant (PDA), a cellular telephone or a satellite telephone, for example. The mobile device 102 includes electronic components, including internal communication components and circuitry as further described with relation to FIG. 2 to enable the mobile device 102 to function and to communicate wirelessly with other devices.

Figure 2:
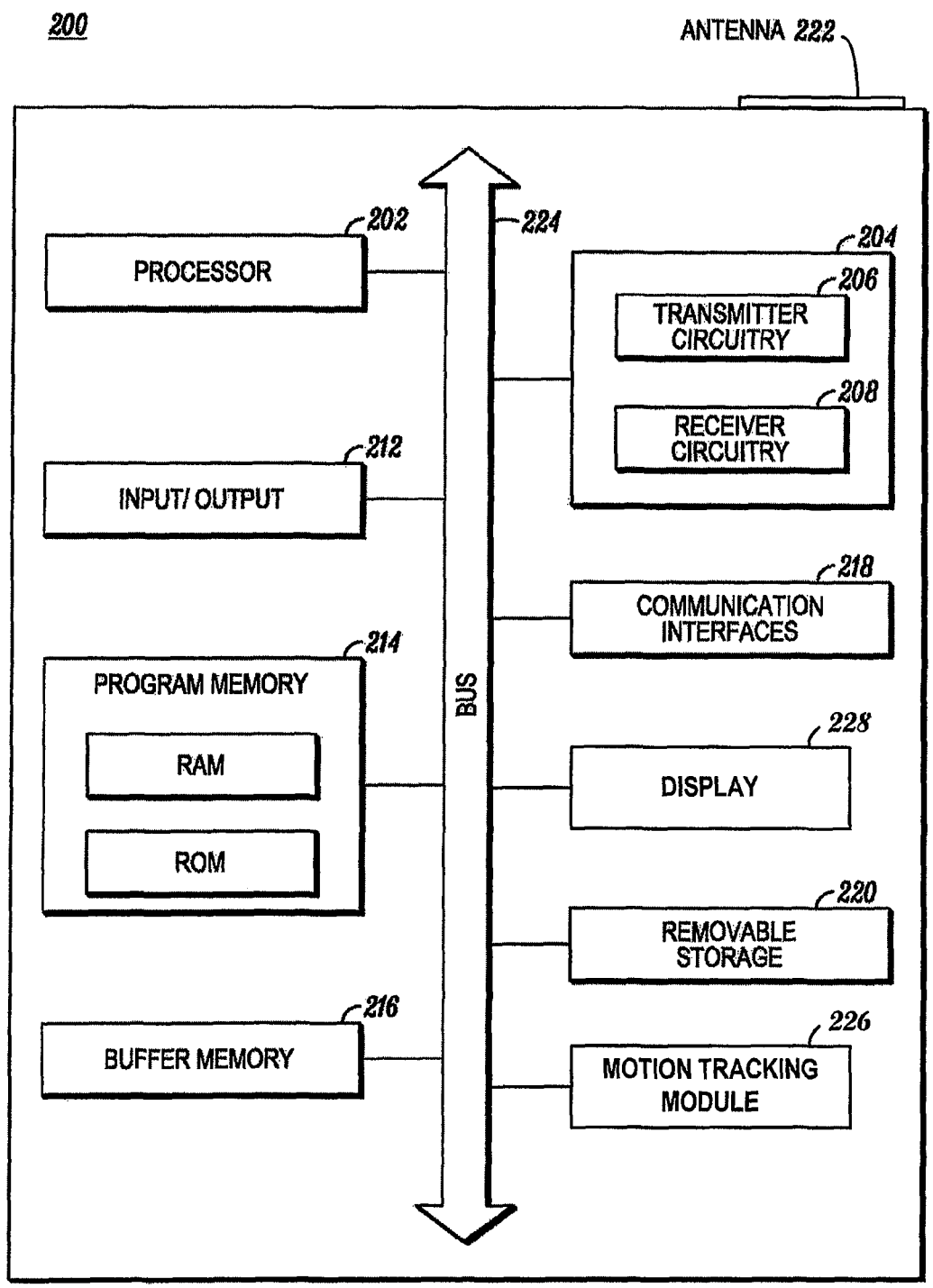
FIG. 2 is a block diagram illustrating the electronic components of the mobile device of FIG. 1 according to the invention

FIG. 2 is a block diagram 200 illustrating the electronic components of the mobile device 102 (FIG. 1) according to the invention. The mobile device 102 contains, among other components, a processor 202, a transceiver 204 including transmitter circuitry 206 and receiver circuitry 208, an antenna 222, the I/O devices 212 described in relation to FIG. 1, a program memory 214 for storing operating instructions that are executed by the processor 202, a buffer memory 216, one or more communication interfaces 218, an integrated display 228, an optional removable storage 220, and a motion tracking module 226 coupled to the mobile device 100.

The motion tracking module 226 is rigidly coupled to the mobile device 102 (FIG. 1) for tracking a movement of the mobile device 102, for example. The motion tracking module 228 can include one or more motion tracking components, such as an accelerometer, a gyroscope, a global positioning system (GPS) module, magnetometer, and digital compass, for example. Other suitable components can also be used. In some embodiments, the motion tracking module 226 can be used to track a location and/or an orientation of the mobile device 102.

In one embodiment, the motion tracking module 226 includes an accelerometer having three outputs each corresponding to one dimension in space. As will be described in more detail, as the mobile device 102 is moved forward, backward, sidewise, tilted up/down or tilted left/right a software application executing on a processor in the mobile device 102 receives motion data from the motion tracking module 226 and continuously sends the motion data through the network 104 (FIG. 1) to the server 106 which controls the remote camera 108. Parameters of the remote camera 108 are changed based on the motion data.

In one embodiment, the motion tracking module 226 can include a face detection module. The face detection module can include face detection software that is capable of detecting and tracking a human face. When activated, the optional face detection module can control parameters of the remote camera 108 in response to the detection of a face in the image from the remote camera 108. For example, the face detection module can command the remote camera 108 to pan right if it detects a face moving right relative to the display 228 of the mobile device 102. In one embodiment, the activated face detection module can optionally override control of the remote camera 108 by the movement of the mobile device 102.

The images captured by the remote camera 108 are streamed to the device 102 which displays the live streamed data on the display 228. The region and portion of the image to be displayed is computed based on the position of the mobile device 102 relative to the user's eye viewing the display 228. As the user moves the mobile device 102, the parameters of the webcam 108 are modified in response to the movement. The display 228 can optionally display parameters relating to the remote camera 108, such as magnification and positional coordinates, for example. In one embodiment, the parameters can overlay the image on the display 228.

In one embodiment, the motion tracking module 226 can include one or more accelerometers. The accelerometers can have three outputs which are used to track the movements and positional information of the device 102 relative to the portion of the image displayed on the display 228. The accelerometer output at any time can be represented by output signals x, y, z.

The device 102 displays a remote image as seen by the webcam 108 which is connected through a network (LAN/WLAN/WAN). In one illustrative example, the distance between the user's eyes and the display 228 of the mobile device 102 (initial position) corresponds to a desired zoom level of the remote image. At the initial position, the accelerometer output is represented by output signals x0, y0, z0, during which the remote webcam output is displayed on the display of the mobile device 102. The user then changes the position or orientation of the device 102. For example, if the user moves the device 102 away from his eyes, the distance between the user's eyes and the display 228 of the mobile device 102 increases. The accelerometer will output new output signals x1, y1, and z1 which are transmitted to the remote webcam 108. One or more parameters of the webcam 108 (e.g., zoom) change in response to the newly received output signals from the accelerometer.

Next, the user again changes the position or orientation of the device 102. For example, the user moves the mobile device 102 closer to the user's eyes, thereby decreasing the distance between the user's eyes and the display 228 of the mobile device 102. The accelerometer outputs new output signals x2, y2, z2, which are continuously transmitted via the network 104 to the remote webcam 108. One or more parameters of the webcam 108 (e.g., zoom) change in response to the newly received output signals from the accelerometer. In one embodiment, the server 106 is capable of transmitting a portion of the image to the mobile device 102 based on the motion parameters received from the mobile device 102.

In one embodiment, the mobile computing device 102 is an integrated unit containing the components depicted in FIG. 2, as well as any other component necessary for the mobile computing device 102 to function. In one embodiment, the electronic components are connected by a bus 224.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the mobile device 102 are described in detail below.

The transmitter circuitry 206 and the receiver circuitry 208 enable the mobile device 100 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the mobile device 102 and the devices with which it is to communicate. For example, the transmitter and receiver circuitry 206, 208 can be implemented as part of the communication device hardware and software architecture in accordance with known techniques. One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. The antenna 222 can be a WAN or a LAN antenna or a cellular network antenna coupled to the transceiver 204.

The buffer memory 216 may be any form of volatile memory, such as RAM, and is used for temporarily storing information received from the remote server 106, for example. The removable memory 220 can be a secure digital (SD) memory card, for example.

The display 228 displays data generated by software applications residing in the memory 214 and executing on the processor 202 as well as images received from the remote camera 108. The display 228 can be a liquid crystal display (LCD) or any other suitable display. In one embodiment, the display 228 is a touch screen display having user input capabilities. For example, the user can touch the surface of the display 228 to activate a function of the device 102.

It should be noted that a software application executing on a processor 202 of the mobile device 102 generates control signals that can be transmitted to the remote camera 108 at fixed time intervals for a given time period. For example, control signals can be transmitted to the camera 108 while the mobile device 102 is moving and such commands can be sampled and/or transmitted at a predetermined rate. Control commands can vary, and can include, for example, pan, tilt, focus, and zoom, or combinations thereof.

In one embodiment, the mobile device 102 can include a command that saves parameters of the remote camera 108 in the memory 214 for future use. For example, a user may preset the focus and zoom to a desired setting and save those parameters in the memory 214. In one embodiment, the mobile device 102 can include a user interface (UI) that can be used to retrieve previously saved camera parameters saved in the memory 214. Upon selection of a previously saved parameter, the mobile device 102 would transmit control signals to the remote camera 108, thereby causing the remote camera 108 to respond to the control signals.

The user interface on the mobile device 102 can also include "activate" and "exit" options. A user can relinquish control of the remote camera 108 by selecting the exit option. In one embodiment, the exit option can cause the mobile device 102 to simply relinquish control of the remote camera 108 while still displaying the image from the remote camera 108 on the display 228. In another embodiment, the exit option can terminate the application, thereby causing the mobile device 102 to relinquish control of the remote camera 108 and terminating the image on the display 228.

In some embodiments, multiple mobile devices 102 connected to the network 104 can control the remote camera 108. In one embodiment, a dynamic queue can be established with users having various privileges. For example, users having administrator privileges can be moved to the front of the queue, while general users can be moved to the back of the queue. Thus, as users relinquish control of the remote camera 108, other users in the queue can gain control. Emergency control can also be provided through passwords or override authority.

Additionally, users can be assigned certain control rights. For example, some users may be prevented from controlling certain parameters of the remote camera 108. Additionally, users may be granted specific time periods in which to control the remote camera 108. In one embodiment, camera control intervals can be based on the number of control requests received by the server 106 (FIG. 1). In one embodiment, camera control intervals can be based on subscriber fees. Camera control privileges can be configured by a system administrator. For example, system administrators can remove a user from the queue, and/or permanently deny privileges to a user. Skilled artisans will appreciate that various queuing techniques and management can be used without departing from the spirit and scope of the invention.

In one embodiment, each user in the control queue can view the images from the remote camera 108 on that user's mobile device 102 even though only one of those users is controlling the remote camera 108. Additionally, each mobile device 102 can optionally display parameters relating to the remote camera 108 being controlled by the controlling mobile device 102. In one embodiment, the display 228 can also indicate the estimated time in which each user will gain control of the remote camera 108.

Figure 3:
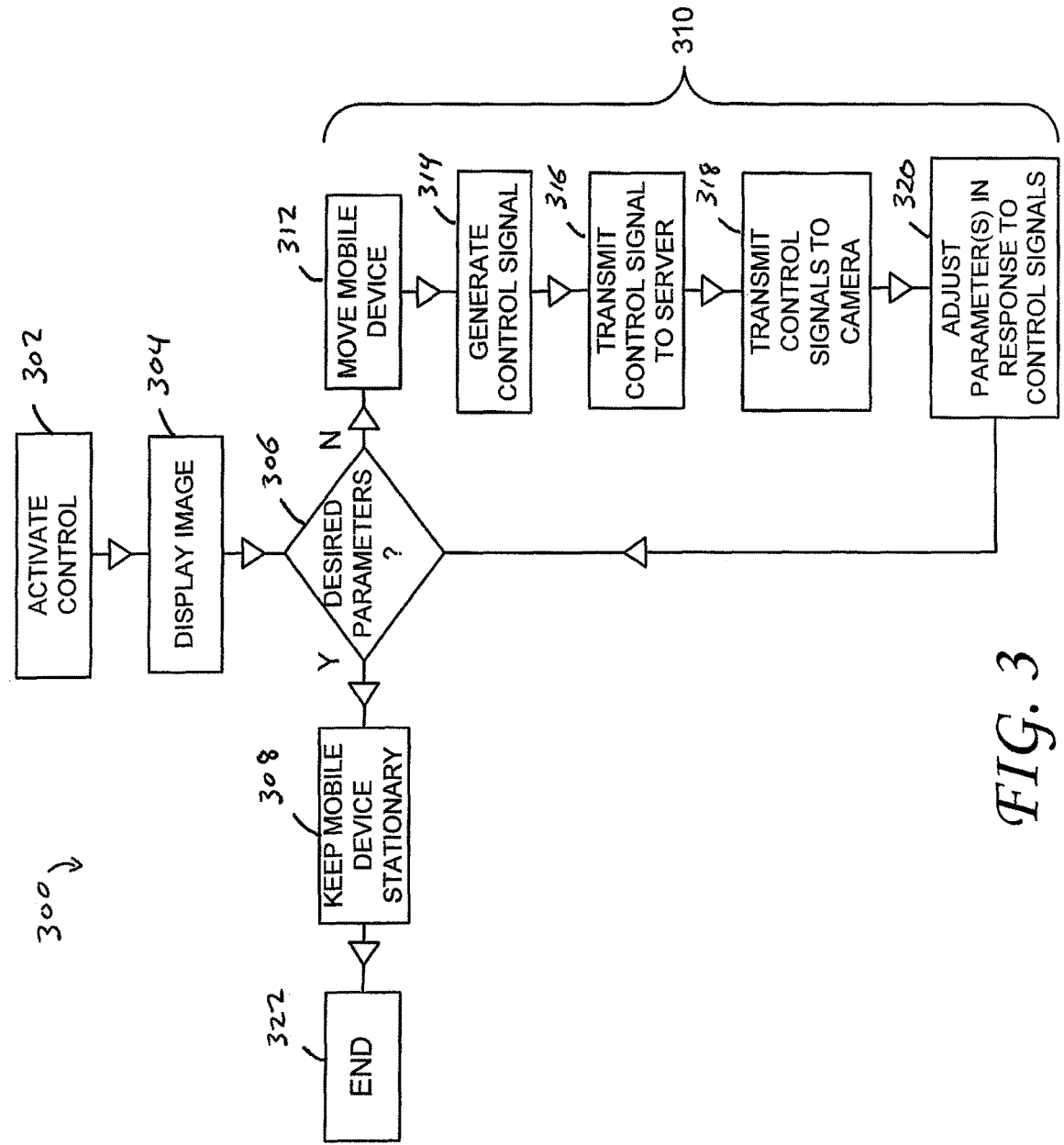
FIG. 3 is a flowchart illustrating one mode of operation of a system in accordance with the invention.

FIG. 3 is a flowchart 300 illustrating one mode of operation of a system in accordance with the invention. In a first step 302, a user activates the remote camera control application on the mobile device 102 (FIG. 1). The activation can be achieved through the interaction with a user interface on the mobile device 102, for example.

In step 304, an image from the remote camera 108 is displayed on the display 110 of the mobile device 102. In one embodiment, parameters of the remote camera 108 are also displayed. In step 306, if the parameters of the remote camera 108, such as pan, tilt, zoom and/or focus are satisfactory, the mobile device 102 should remain substantially stationary (step 308) until such time that the displayed image is no longer satisfactory. It should be noted that the term substantially stationary can include small movements of the mobile device 102. Moreover, the sensitivity to movement of the mobile device 102 can be modified as required by the user. For example, each user can calibrate the motion tracking module 114 to prevent parameters of the remote camera 108 from changing due to inadvertent small movements of the mobile device 102.

Referring back to step 306, if the desired parameters of the remote camera 108 are not satisfactory, the system enters a control loop 310. The control loop 310 includes initially moving the mobile device 102 to a position that is likely to achieve a satisfactory image from the remote camera 108 (step 312). In one embodiment, as the mobile device 102 is moving, the motion tracking module 114 is transmitting control signals to the remote camera 108 in real-time to allow for a very fluid motion of the image on the display (step 314). In another embodiment, the system samples the control signals from the motion tracking module 114 as the mobile device 102 is moving, and provides only periodic control signals to the remote camera 108. This could reduce the network bandwidth otherwise required to provide real-time fluid response from the remote camera 108.

In step 316, the mobile device 102 transmits the control signals to the server 106. In one embodiment, the mobile device 102 can connect to the server 106 through the network 104. In practice, any technique that allows a mobile device 102 to transmit control signals to a remote server 106 can be used.

In step 318, the server 106 transmits the control signals to the remote camera 108. In one embodiment, the server 106 can connect to the remote camera 108 through a network. In another embodiment, the server 106 can be directly connected to the control system of the remote camera 108, through a serial or parallel port, universal serial port (USB), Ethernet, a Bluetooth® radio, or a Zigbee radio, for example. In practice, any technique that allows a server 106 to transmit control signals to a remote camera 108 can be used.

In step 320, certain parameters of the remote camera 108 are adjusted in response to the control signals from the mobile device 102. For example, the control signals can command the remote camera 108 to pan, tilt, zoom and/or focus. The control loop 310 repeats until the desired parameters are achieved (step 306). The mobile device 102 should then display an image having the desired characteristics on the display of the mobile device 102. The process is ended at step 322.

Figure 4:
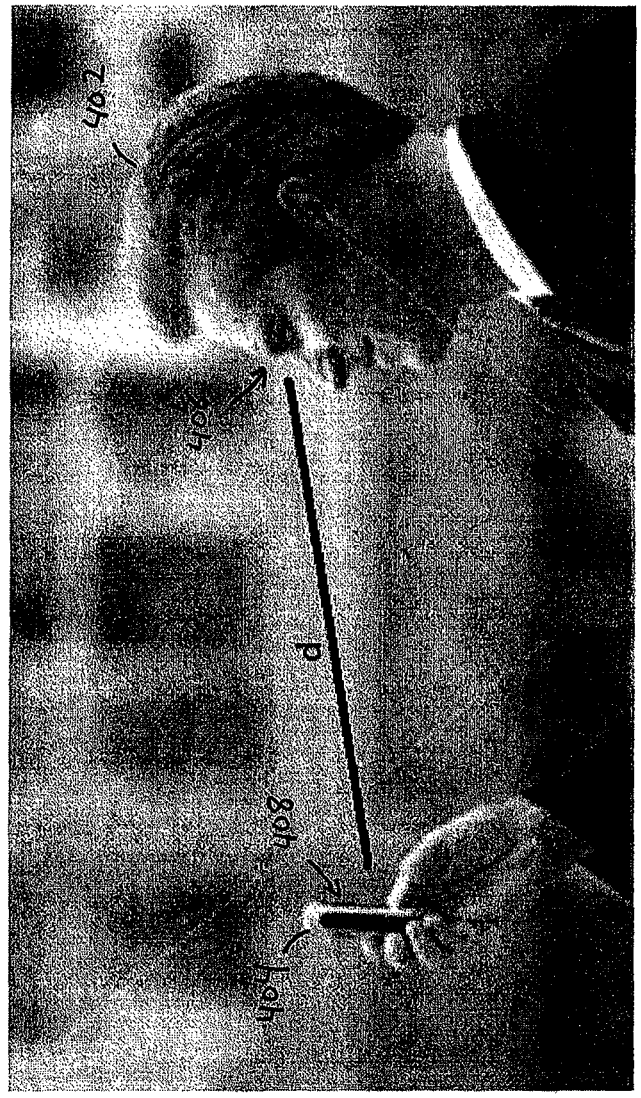
FIG. 4 is an illustration of a user of a mobile device according to the invention.

FIG. 4 is an illustration 400 of a user 402 of a mobile device 404 according to the invention. The user 402 holds the mobile device 404 at a distance (d) from his eyes 406, such that he can view an image from a remote camera (not shown) on a display 408 of the mobile device 404. As the user 402 moves the mobile device 404 certain parameters of the remote camera can be changed. For example, as the user 402 moves the mobile device 404 to his right, the remote camera can pan to the right, thereby following the movement of the mobile device 404.

In another example, as the mobile device 402 is moved closer to the user's eyes 406, the remote camera can zoom in, thereby magnifying the image displayed on the display 408. Alternatively, as the mobile device 402 is moved further from the user's eyes 406, the remote camera can zoom out, thereby shrinking the image displayed on the display 408. It should be noted that the zoom control can be altered if desired. For example, moving the mobile device 402 further away from the user's eyes can cause the remote camera to zoom in, thereby magnifying the image displayed on the display 408.

In one embodiment, the remote camera can include an auto-focus module that controls the focus of the remote camera. In one embodiment, the mobile device 404 can include a focus control that enables the mobile device 404 to manually control the focus of the remote camera. For example, the mobile device 404 can include a switch to activate and deactivate manual focus control. In one embodiment, the mobile device 404 can be rotated clockwise and/or counterclockwise to control the focus of the remote camera. A control on the mobile device 404 can hold the focus setting when the desired focus is achieved.

Figure 5:
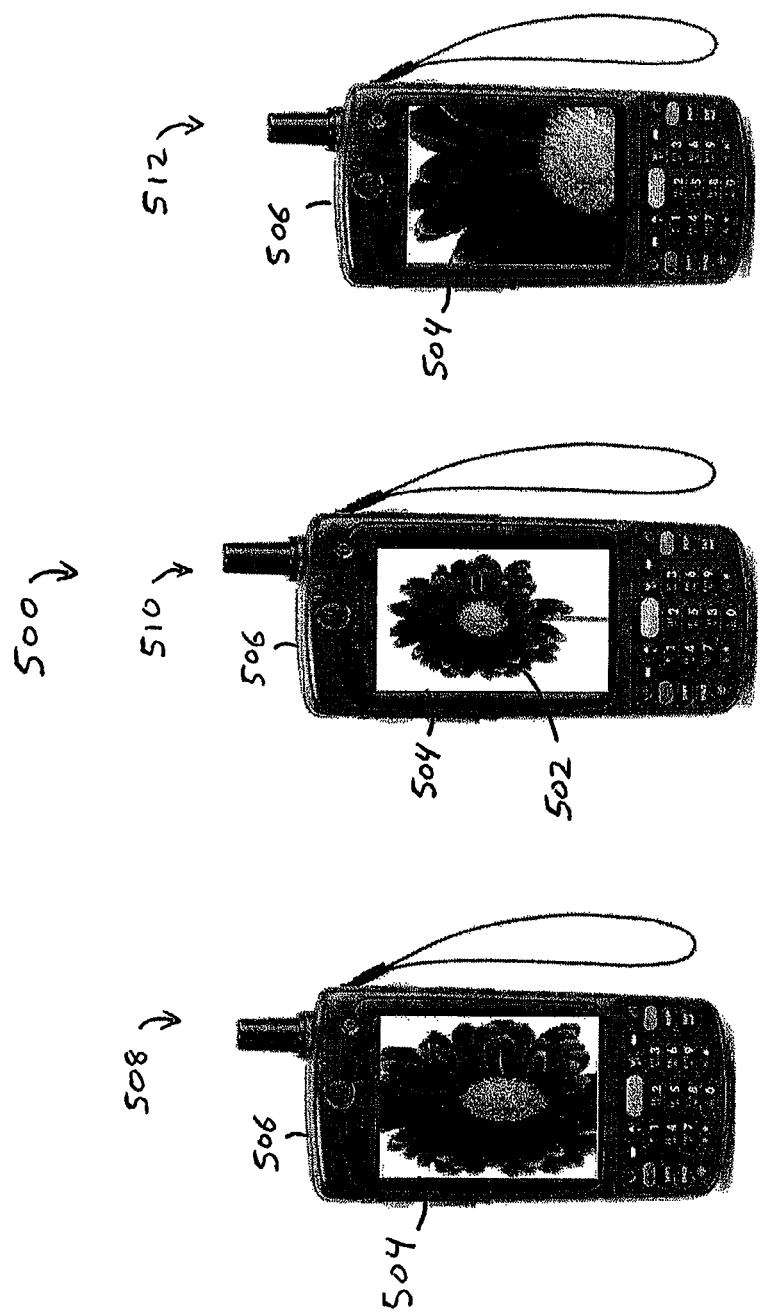
FIG. 5 is an illustration of an image on a display of a mobile device according to the invention.

FIG. 5 is an illustration 500 of an image 502 on a display 504 of a mobile device 506 according to the invention. The image 502 is displayed at three different zoom levels 508, 510, 512. As previously described, the movement of the mobile device 506 can control the zoom level of the remote camera transmitting the image 502.

Figure 6:
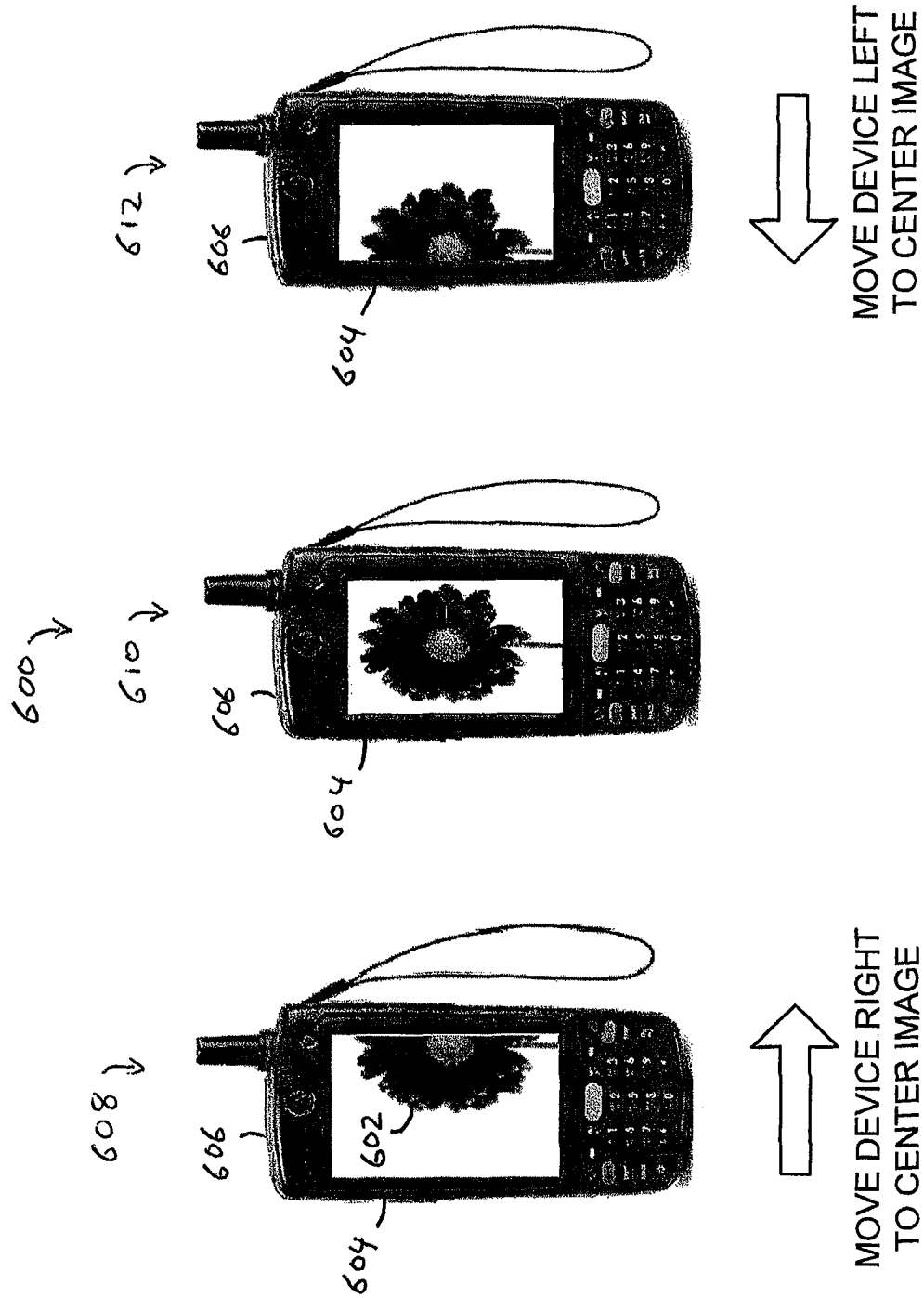
FIG. 6 is another illustration of an image on a display of a mobile device according to the invention.

FIG. 6 is another illustration 600 of an image 602 on a display 604 of a mobile device 606 according to the invention. The image 602 is displayed at three different horizontal pan angles 608, 610, 612. As previously described, the movement of the mobile device 606 can control the horizontal pan angles of the remote camera transmitting the image 602.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for remotely controlling the networked camera described herein. The non-processor circuits may include, but are not limited to, a radio receiver, a radio transmitter, signal drivers, clock circuits, power source circuits, and user input devices. As such, these functions may be interpreted as steps of a method to remotely control the networked camera described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts or steps is intended to be required unless specifically indicated.

What is claimed is:

1. A mobile device for controlling a remote camera, comprising:
   a housing;
   a processor located within the housing;
   a transceiver coupled to the processor for communicating with a remote server, the remote server being coupled to the remote camera;
   a motion tracking component mechanically coupled to the housing and electrically coupled to the processor for generating a motion signal based on a motion of the mobile device as a whole in a space relative to a user, the remote server controlling a parameter of the remote camera in response to the motion signal based on the motion of the mobile device, the motion tracking component comprising an accelerometer; and
   a display coupled to the processor for displaying an output signal from the remote camera, the output signal being associated with the parameter of the remote camera,
   wherein when the accelerometer detects a movement of the mobile device away from or towards the user, the parameter comprises a zoom and the transceiver transmits a respective zoom control command to the remote server for zooming the remote camera.

2. The mobile device of claim 1, wherein the parameter further comprises one of a pan, a tilt and a focus.

3. The mobile device of claim 1, wherein the remote camera comprises a webcam.

4. The mobile device of claim 1, wherein the transceiver comprises a cellular radio.

5. The mobile device of claim 1, wherein the motion tracking component further comprises at least one of a gyroscope, a global positioning system (GPS) module, a magnetometer, and a digital compass.

6. The mobile device of claim 1, further comprising a face detection module coupled to the processor, the face detection module controlling a parameter of the remote camera in response to a detection of a face.

7. A system comprising:
   a mobile device having a motion tracking component for generating a motion signal based on a motion of the mobile device as a whole in a space relative to a user, the motion tracking component comprising an accelerometer;
   a remote server in communication with the mobile device, the remote server receiving the motion signal; and
   a remote camera in communication with the remote server, the remote server controlling a parameter of the remote camera in response to the motion signal based on the motion of the mobile device, wherein when the accelerometer detects a movement of the mobile device away from or towards the user, the parameter comprises a zoom and the mobile device transmits a respective zoom control command to the remote server for zooming the remote camera.

8. The system of claim 7, wherein the mobile device comprises a transceiver for communicating with the remote server.

9. The system of claim 8, wherein the transceiver comprises a cellular radio.

10. The system of claim 7, wherein the remote server and the remote camera are integrated into a single remote unit.

11. The system of claim 7, wherein the mobile device further comprises a display for displaying an output signal from the remote camera, the output signal being associated with the parameter of the remote camera.

12. The system of claim 7, wherein the parameter further comprises one of a pan, a tilt, and a focus.

13. The system of claim 7, wherein the parameter further comprises a selection of a portion of an image captured by the remote camera.

14. The system of claim 7, wherein the remote camera comprises a webcam.

15. The system of claim 7, wherein the motion tracking component further comprises at least one of a gyroscope, a global positioning system (GPS) module, a magnetometer, and a digital compass.

16. The system of claim 7, wherein the mobile device further comprises a face detection module, the face detection module controlling a parameter of the remote camera in response to a detection of a face.

17. A system comprising:
a remote camera comprising:
an optical controller including a focussing lens, a focusing sensor and firmware for focussing the focussing lens and processing video signals; and
a mechanical controller including drivers and mechanics for adjusting the focussing lens, adjusting a zoom lens, and controlling movements of the remote camera;
a remote server in communication with the remote camera, the remote server configured to receive a motion signal and to control a parameter of the remote camera in response to the motion signal; and
a mobile device configured to generate the motion signal based on a motion of the mobile device and to send the motion signal to the remote server wirelessly, the mobile device comprising:
a unitary housing;
a processor located within the unitary housing;
an antenna configured to transmit the motion signal;
a transceiver including transmitter circuitry and receiver circuitry, the transceiver being coupled to the processor and the antenna and being configured to communicate wirelessly with the remote server via the antenna;
a motion tracking component mechanically coupled to the unitary housing and electrically coupled to the processor for generating the motion signal based on the motion of the mobile device as a whole in a space relative to a user, the remote server controlling the parameter of the remote camera in response to the motion signal based on the motion of the mobile device, the motion tracking component comprising an accelerometer and at least one of:
a gyroscope;
a global positioning system (GPS) module;
a magnetometer; and
a digital compass;
a face detection module coupled to the processor, the face detection module configured to detect and track a face of the user for controlling the parameter of the remote camera; and
a display coupled to the processor for displaying an output signal from the remote camera, the output signal being associated with the parameter of the remote camera,
wherein when the accelerometer detects a movement of the mobile device away from or towards the user, the parameter comprises a zoom and the transceiver transmits a respective zoom control command to the remote server for zooming the remote camera.

18. The mobile device of claim 1, wherein when the accelerometer detects a movement of the mobile device left, right, up or down, relative to the user, the parameter comprises a pan and the transceiver transmits a respective zoom control command to the remote server for panning the remote camera in a direction corresponding to the movement of the mobile device.

19. The system of claim 7, wherein when the accelerometer detects a movement of the mobile device left, right, up or down, relative to the user, the parameter comprises a pan and the mobile device transmits a respective zoom control command to the remote server for panning the remote camera in a direction corresponding to the movement of the mobile device.

20. The system of claim 17, wherein when the accelerometer detects a movement of the mobile device left, right, up or down, relative to the user, the parameter comprises a pan and the transceiver transmits a respective zoom control command to the remote server for panning the remote camera in a direction corresponding to the movement of the mobile device.

* * * * *